UNITED STATES PATENT OFFICE 2,648,695

INTRAMOLECULAR ESTERS OF HYDROXY OR AMINO PHOSPHINIC ACIDS

Curtis W. Smith, Berkeley, Calif., assignor to Shell Development Company, San Francisco, Calif., a corporation of Delaware No Drawing. Application July 25, 1949, Serial No. 106,735

6 Claims. (Cl. 260—461)

This invention relates to the phosphorus analogs of the lactones. More particularly, the invention pertains to a new class of compounds, namely, the intramolecular esters of phosphinic acids which contain a hydroxyl group attached to the third or fourth carbon atom of an open chain of carbon atoms terminated by a phosphorus atom. Still more particularly the invention pertains to intramolecular esters of hydroxy-substituted saturated phosphinic acids, which hydroxy-substituted saturated phosphinic acids contain the structures HOCCCPHOOH, HOCCCP(C)OOH, HOCCCCPHOOH, or

HOCCCCP(C)OOH

The compounds provided by the process of the present invention each contain one of the following structures:

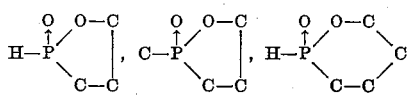

or

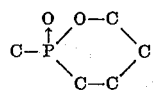

A more limited group of novel compounds to which this invention pertains is defined by the structural formula

in which R' represents a member of the group consisting of hydrogen and hydrocarbon and R represents a divalent saturated hydrocarbon radical having the two free valencies located on different carbon atoms which are separated from each other by not less than one and not more than two intervening carbon atoms, said free valencies being satisfied by union with the respective atoms designated in said structural formula by P and by O.

The compounds of the present invention have been found to be readily reactive with a wide variety of organic materials. They are particularly valuable as intermediates in the synthesis of individual derivatives of polyfunctional phosphinic acids. Heretofore the methods of preparing phosphinic acids or their derivatives have, except in rare instances, either required the use of costly reactants (such as the Grignard reagents) or have depended upon reactions which are not adaptable to the production of individual compounds (such as the reaction between hydrocarbons, phosphorus trichloride and aluminum trichloride). The compounds provided by the present invention can be readily isolated and purified. They undergo combination reactions with metal salts of acids, esters, alcohols, nitriles and the like, to produce derivatives of polyfunctional phosphinic acids For example, the intramolecular ester of 3-hydroxy-propane-phosphinic acid combines to form salts of substituted propanephosphinic acids in accordance with schematic equations such as the following:

$$\xrightarrow{\text{RONa}} \text{ROCH}_2\text{CH}_2\text{CH}_2\text{PHOONa}$$

$$\xrightarrow{\text{KCN}} \text{NCCH}_2\text{CH}_2\text{CH}_2\text{PHOOK}$$

$$\xrightarrow{\text{RCOONa}} \text{RCOOCH}_2\text{CH}_2\text{CH}_2\text{PHOONa}$$

In addition, the compounds provided by the present invention are valuable surface active agents, flame-proofing agents, plasticizers, and lubricant additives.

The compounds provided by the present invention will be referred to (by analogy from the nomenclature used for lactones) as the "phostones" of particular phosphinic acids. Where two organic radicals are attached to the phosphorus atom of the phosphinic acid, the radical not involved in the ring will be referred to as a P- substituent (by analogy from the terminology employed for the organic amines), e. g., a compound of the formula $$\text{H}\overset{\text{O}}{\underset{|}{\text{P}}}(\text{O})\text{CH}_2\text{CH}_2\text{CH}_2\text{CH}_2$$

will accordingly be referred to as 4-hydroxy-butanephosphinic acid and the compound of the formula $$\text{PhP}(\text{O})\text{CH}_2\text{CH}_2\text{CH}_2$$

as P-phenyl 3-hydroxypropanephosphinic acid phostone.

The phostones of phosphinic acids can be prepared by a variety of methods. For example, they may be prepared by dehydrohalogenating a 3 or 4-halo phosphinic acid, or by heating the silver salt of a 3 or 4-iodo phosphinic acid.

A particularly convenient method of preparing the phostones comprises the dehydration of a 3 or 4-hydroxy phosphinic acid. It has been found that such acids can be readily dehydrated merely by heating them to a temperature of from 100 to 200° C. under conditions allowing the escape of water.

Phosphinic acids containing a hydroxyl group attached to a third or fourth carbon atom of an open chain of saturated carbon atoms attached to phosphorus can be prepared by a variety of methods. A particularly suitable method of preparing them is described and claimed in the copending application of Stiles, Harman and Rust, Serial No. 20,608, filed April 12, 1948. By this method, a salt of hypophosphorus acid or a phosphinic acid containing a P-H group is caused to add to the double bond of an olefinically unsaturated alcohol in the presence of free radicals. The free hydroxy-substituted phosphinic acid is readily obtained by treating the resulting phosphinic salt with an equivalent amount of strong organic acid. In addition, hydroxy phosphinic acids can be prepared by the rearrangement of a phosphinite ester [an ester of the formula RP(OR)$_2$ where the R's represent organic radicals] by heating the ester with a 3 or 4-halo-substituted alcohol and hydrolyzing the phosphinate ester so produced. This reaction is accomplished under conditions similar to those generally employed for the rearrangement of trialkyl phosphites in the presence of organic halides (the "Arbuzov reaction").

Illustrative examples of the compounds provided by the invention include 3-hydroxypropanephosphinic acid phostone, 2-methyl-3-hydroxypropanephosphinic acid phostone, 4-hydroxybutanephosphinic acid phostone, P-phenyl 3-hydroxypropanephosphinic acid phostone, P-methyl 2-methyl-3-hydroxypropanephosphinic acid phostone, P-3-hydroxypropyl 3-hydroxypropanephosphinic acid phostone, 3-hydroxyeicosanephosphinic acid phostone and P-dodecyl-4-hydroxybutanephosphinic acid phostone.

The compounds provided by the invention may contain one or more substituents such as hydroxy, amino, halo, alkoxy, alkylmercapto, and the like groups.

A preferred class of compounds of the invention consists of intramolecular esters of hydrocarbon phosphinic acids containing a hydroxy group attached to the third or fourth carbon atom of an open chain of saturated carbon atoms attached to phosphorus, i. e., acids of the formula

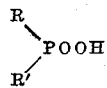

where R is a saturated hydrocarbon radical containing a hydroxyl group attached to the third or fourth carbon atom of an open chain of carbon atoms terminated by the indicated phosphorus atom, and R' is a hydrogen atom or a hydrocarbon radical.

The intramolecular esters of 3 or 4-hydroxy-alkane-phosphinic acids comprise a particularly valuable subclass of compounds provided by the present invention.

The following examples are presented to illustrate in detail procedural steps which result in the production of the described compounds in accordance with the process of the present invention. However, as the invention embraces many variations in reactants and reaction conditions, it is not to be construed as being limited to the particular materials or conditions recited in the examples.

EXAMPLE I

2-methyl-3-hydroxypropanephosphinic acid phostone

The sodium salt of the corresponding hydroxy acid is prepared by heating a solution of 0.5 mole of sodium hypophosphite monohydrate, 0.5 mole of methallyl alcohol, 100 mls. of methanol and 1 ml. of 2,2-bis(tertiary-butylperoxy) butane at 130° C. for one hour. The salt is converted to the acid by concentrating the reaction products under reduced pressure, adding an excess of hydrochloric acid and filtering off the precipitated salt.

The phostone is prepared in accordance with the process of the present invention by heating the acid at a temperature of 100–150° C. under conditions conducive to the removal of water. The phostone is isolated by a fractional distillation and has the formula,

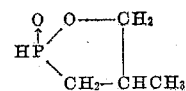

EXAMPLE II

P-phenyl 3-hydroxypropanephosphonic acid phostone

The ester of the corresponding acid is prepared by refluxing, under conditions conducive to the removal of methyl chloride, 0.5 mole of dimethyl benezenephosphinite and 0.5 mole of 3-bromopropanol. The corresponding acid is prepared by refluxing the ester under similar conditions with concentrated hydrochloric acid.

The phostone is prepared in accordance with the process of the present invention by heating the acid at a temperature of 100–150° C. under conditions conducive to the removal of water. The phostone is isolated by a fractional distillation and has the formula

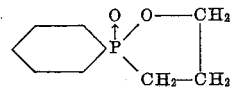

EXAMPLE III

4-hydroxybutanephosphinic acid phostone

The sodium salt of the corresponding hydroxy acid is prepared by heating a solution of 0.5 mole of sodium hypophosphite monohydrate, 0.5 mole of 3-butenol, 100 mls. of methanol and 1 ml. of 2,2-bis(tertiary-butylperoxy) butane at 130° C. for one hour. The salt is converted to the acid by concentrating the reaction products under reduced pressure, adding an excess of hydrochloric acid and filtering.

The phostone is prepared in accordance with the process of the present invention by heating the acid at a temperature of 100–150° C. under conditions conducive to the removal of water. The phostone is isolated by a fractional distillation and has the formula

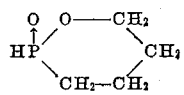

That the compounds provided by the present invention have the indicated structures was established by the isolation and characterization of various compounds prepared in the indicated manners. For example, from the product produced by the reaction described in Example I the phostone was isolated in the form of a clear colorless residue boiling at 100–104° C./0.2 mm. pressure. An elementary analysis of the product revealed that it contained 38.5, 38.7% carbon, 7.2, 7.7% hydrogen and 25.2% phosphorus which values, recognizing that a small amount of water was present in the sample analyzed, are in agreement with the respective values, 40.0%, 7.55% and 25.8%, calculated for a compound of the formula $C_4H_9PO_2$. That the compound was an ester and that it undergoes reactions characteristic of cyclic intramolecular esters was established by the finding that the compound had an ester value of 0.806, 0.819 equivalents per 100 grams (the calculated value for $$\overset{\longleftarrow O \longrightarrow}{HP(O)CH_2CH(CH_3)CH_2}$$

is 0.834 equivalent per 100 grams). The compound was soluble in chloroform and water but insoluble in ether and was unreactive toward silver nitrate (further confirmation of the ester structure).

I claim as my invention:

1. The intramolecular ester of 2-methyl-3-hydroxypropanephosphinic acid, having the structural formula

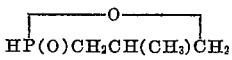

2. The intramolecular ester of 3-hydroxypropane-(benzene)phosphinic acid, having the structural formula

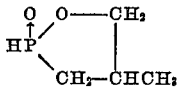

3. A process for the intramolecular esterification of 2-methyl-3-hydroxypropanephosphinic acid, which comprises, heating the acid to a temperature of 100–150° C. until there is formed the intramolecular ester of said acid, having the formula

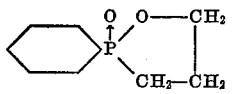

4. The intramolecular ester of 4-hydroxybutanephosphinic acid, having the structural formula

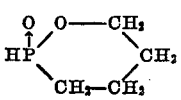

5. A chemical compound having a structure represented by the structural formula

in which R' represents one of the group consisting of hydrogen and hydrocarbon and R represents a divalent saturated hydrocarbon radical having the two free valencies located on different carbon atoms which are separated from each other by not less than one and not more than two intervening carbon atoms, said free valencies being satisfied by union with the respective atoms designated in said structural formula by P and by O.

6. A process for the production of a chemical compound having a structure represented by the structural formula

in which R' represents a member of the group consisting of hydrogen and hydrocarbon and R represents a divalent saturated hydrocarbon radical having the two free valencies located on different carbon atoms which are separated from each other by not less than one and not more than two intervening carbon atoms, said free valencies being satisfied by union with the respective atoms designated in said formula by P and by O, which process comprises heating at a temperature of from 100° C. to 200° C. until said chemical compound is formed, the corresponding hydroxy-substituted phosphinic acid having a structure defined by the structural formula

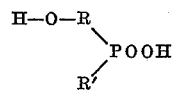

in which R' and R represent the same respective groups or atoms defined hereinabove.

CURTIS W. SMITH.

References Cited in the file of this patent

UNITED STATES PATENTS

| Number | Name | Date |
| --- | --- | --- |
| 2,268,158 | Marvel | Dec. 30, 1941 |
| 2,382,309 | Hamilton | Aug. 14, 1945 |
| 2,382,622 | Toy | Aug. 14, 1945 |

OTHER REFERENCES

Drake et al., J. Org. Chem., vol. 2, pages 387–399 (1937).